April 4, 1961 J. H. ANDRESEN, JR 2,978,546

MAGNETIC RECORDER WITH ECHO EFFECT

Filed April 14, 1958

INVENTOR.
JOHN H. ANDRESEN, JR.

BY Ostrolenk, Faber, Gerb & Soffen
ATTORNEYS

United States Patent Office 2,978,546

Patented Apr. 4, 1961

2,978,546

MAGNETIC RECORDER WITH ECHO EFFECT

John H. Andresen, Jr., Forest Knolls, Greenwood Lake, N.Y.

Filed Apr. 14, 1958, Ser. No. 728,269

7 Claims. (Cl. 179—100.2)

This invention relates generally to the provision of echo effects in magnetic recorders and more particularly to novel arrangements for selectively providing an echo to conventional recordings when played back. The invention is applicable to conventional magnetic tape or wire recorder systems, and is simple and effective for use by ordinary laymen.

In usual recorder systems, the recording head is preceded by an erase magnetic head along the wire or tape path. The erase head is fed by current from an erasing oscillator at a frequency which readily obliterates the previous magnetic recording just preceding the recording by the adjacent head, as is now well known in the art. During playback of the recorded matter, the erase head is disconnected from the oscillator, or the oscillator rendered inoperative, in order to preserve the recording. The recording head thereupon acts as a pick-up device, translating the magnetic variations on the tape or wire to corresponding electrical signals. The signals are amplified and played through the recorder speaker. These two magnetic heads are effectively separated by about one-third of an inch in tape recorders in common use, but separations of different magnitudes are also used. A tape speed of seven and one-half inches per second is commonly used in home instruments for recordings of reasonably high fidelity.

In accordance with the present invention I utilize the usual erase magnetic head in a novel manner to provide echo effects in conjunction with the play-back of recorded material on the tape or wire. Such echo effects lend pleasing realism, particularly to instrumental and vocal music. With a tape speed of seven and one-half inches per second, and a spacing on one-third of an inch between the two magnetic heads referred to, a time interval for any portion of the tape to move between the two heads is about 0.45 second. The two heads are interconnected in electrical series or parallel, to simultaneously pickup signals from the moving tape. A displacement effect or sound delay between their program pickup is 0.45 second in the indicated example.

Such delay gives the echo effect to music or speech as is had in a large auditorium, or an effect like that obtained by "echo chambers." By addition of variable impedance in the head circuit, a variable echo effect is derived under the control of the operator. This invention in no way affects the recording action of the recorder system, in that the oscillator connection to the erase head is restored and the recording head reconnected to operate as originally designed, when set in the "record" mode.

It is accordingly an object of the present invention to provide a novel system for providing an echo effect in the play-back of a magnetic recorder, imparting realism to recordings beyond that possible with a single pick-up head.

Another object of the present invention is to provide a novel system of inexpensive nature to impart an echo effect to conventionally pre-recorded material when played by the magnetic recorder.

A further object of the present invention is to provide a novel arrangement utilizing the erase head of a magnetic recorder in conjunction with the play-back head, for imparting predetermined or variable echo effects in the playback operation mode of the recorder.

Still another object of the present invention is to provide novel effective circuit means for readily converting a conventional magnetic recorder to produce echo effects during its play-back mode.

Still another object of the present invention is to provide a novel effective echo circuit for magnetic recorder play-back operation, readily usable by non-technical operators.

The above and further objects of the present invention will become more apparent in the following description of an exemplary embodiment thereof, illustrated in the accompanying drawings in which.

Figure 1:
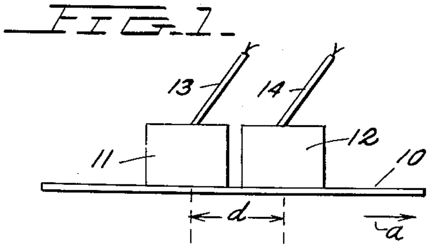
Figure 1 is a diagrammatic showing of the two magnetic heads of a recorder system coacting with a moving magnetic tape.

Figure 1 illustrates the movable tape 10 which is the magnetic carrier or linear medium for the signals recorded and played-back by the recorder system. The arrow *a* indicates its movement from left to right. The magnetic tape 10 may of course be magnetic wire insofar as the invention system is utilized. The two magnetic heads 11 and 12 are mounted physically adjacent each other in magnetic coaction with the movable tape 10. Their effective spacing, i.e. between their magnetic gaps coacting with the magnetic tape 10, is indicated by the distance *d*. The magnetic head 11 is the first head which magnetically coacts with the tape 10 during the "record" mode of operation of the system.

During "record," the magnetic head 11 functions with its erasing action due to erasing oscillator currents fed to it through cable 13. Previous magnetic information stored in the magnetic tape 10 is thereby eliminated, and the tape rendered clean for new recording material, as is well understood in the art. The magnetic head 12 during the "record" mode, is connected to the output of the system amplifier through cable 14. Through the magnetic gap of head 12 the magnetic information is imparted to the moving tape 10 in the conventional manner, to record thereon.

Figure 2:
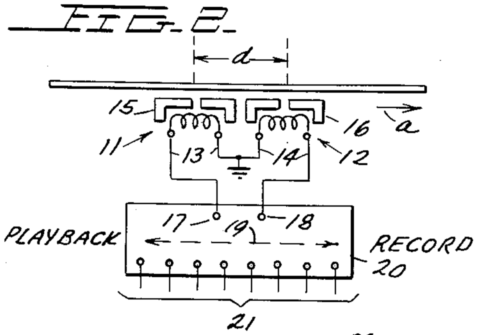
Figure 2 is a schematic electrical diagram of the two recording heads of Figure 1, as connected in a conventional magnetic recorder system.

Figure 2 is an electrical illustration of a section of the conventional recording system for the heads of Figure 1. The magnetic heads 11 and 12 comprise magnetic structures 15 and 16 respectively, having suitable air gaps which coact with the tape 10. The respective cables 13 and 14 for the heads 11 and 12 are connected to the input of selector switch 20, at terminals 17, 18. The selector switch 20 is actuated by the operator through the switch arm indicated by dash lines at 19: to the right for "record" and to the left for "play-back."

The "record-play-back" switch 20 has a plurality of contacts and leads 21 extending to the recording system circuit for effectuating the electrical operation of the system in a manner well known to those skilled in the art. Details of the recorder circuit, not being part of the present invention, are not further illustrated.

Figure 3:
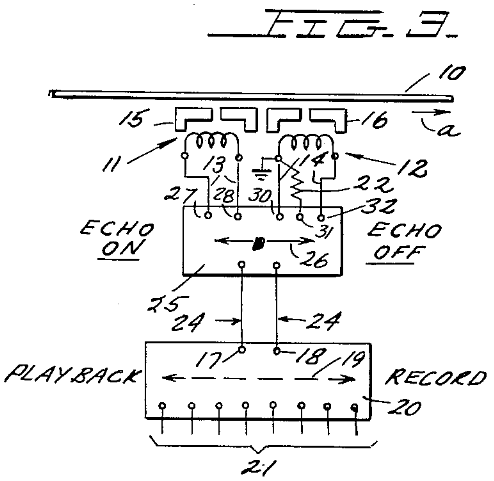
Figure 3 is a schematic electrical diagram of the two magnetic heads of Figure 2 interconnected with an echo circuit in accordance with the present invention.

An important feature of the present invention is to apply an echo circuit to usual or conventional recorder systems, which may be designed and built into an original unit, or an existing unit may be readily converted thereto. Figure 3 is a block diagram of the invention circuit embodying the conventional magnetic heads 11, 12 and the record-playback switch 20, together with the usual circuity thereof in the magnetic recorder system. Interconnected between the magnetic heads 11 and 12 and the switch 20 is an echo switch 25.

The output terminals 24, 24 of echo switch 25 are connected to the input terminals 17, 18 of selector switch 20. The echo switch 25 has an arm 26 which is movable to the right for the "echo-off" position; and to the left, for the "echo-on" position. A further element is resistor 22 in the circuit with the magnetic head 12. Other than changing the circuitry of heads 11 and 12, the interposition of echo switch 25, the remainder of the recorder system is left unchanged in practicing the present invention. This indicates the extreme simplicity with which my invention may be applied to existing or newly designed recorders, for obtaining striking echo effects.

The leads 13 of magnetic head 11 are connected to input terminals 27, 28 of echo switch 25. One lead of magnetic head 12 is grounded and in turn connected to input terminal 30 of switch 25. The resistor 22 is connected between the grounded terminal of lead 14 and input terminal 31 of switch 25. The remaining terminal of cable 14 is connected to input terminal 32 of switch 25.

Figure 4:
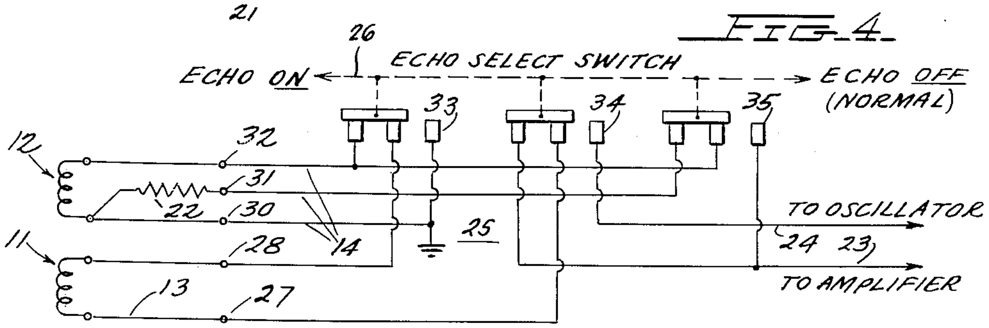
Figure 4 is an electrical diagram illustrating the circuit arrangement of the two magnetic heads of Figure 3 with the echo select switch circuitry.

Figure 4 is a circuit diagram of the exemplary form which my invention may assume in practice. It is to be understood that other arrangements and circuits therefor are equally feasible, within the principles and factors thereof. As described in connection with Figures 1 and 2, the conventional recorder utilizes a magnetic head corresponding to 11 as the erase head, since its magnetic action impinges upon tape 10 moving to the right, prior to that of head 12. This is used as the erase head during the "record" mode of the system, while the magnetic head 12 is used as the recording head. This operation remains unchanged when the selector switch 20 is in the "record" position. In other words, the echo circuit of the present invention does not change the normal operation of the recording and erase coaction of the heads 11 and 12 with the tape. The circuit of Figure 4 restores any circuit change from "echo" mode to that corresponding to Figure 2 for conventional recorder operation during "record" mode. This corresponds to echo selector switch 25 being in the right position, with its arm 26 in the "off" position.

With echo select switch arm 26 to the left, namely to "echo on," the circuit established corresponds to that illustrated in Figure 4, wherein magnetic heads 11 and 12 are interconnected in series as will now be described in more detail. The echo select switch 25 comprises three sets of three pole switches 33, 34, 35. In the illustrated condition, the left and central blades of the three pole switches 33, 34, 35 are engaged by respective shorting bars. Terminal 32 is connected to the left blade of switch 33 and central blade of switch 35. The terminal 30 of magnetic head 12 is connected to the right blade of switch 33. The magnetic head 11 is correspondingly connected to the central blades of switches 33 and 34, from terminals 27, 28. Resistor 22 connects from terminal 31 to the left blade of switch 35.

The output leads 23, 24 of the echo circuit of Figure 4 connect to the input terminals 17, 18 of selector switch 20 (see Figure 3). Output lead 23 constitutes the signal output lead for the "echo on" mode. The "echo on" circuit comprises both heads 11, 12 in series between grounded terminal 30 and lead 23 (see also Figure 5). Lead 23 is in turn connected to the input of the system amplifier through record-playback switch 20 in the "play-back" position, as will be understood by those skilled in the art. Output lead 24 connects with an open blade of switch 34 for the echo-on mode switch 25, and is out of circuit (see also Figure 5). When record-play-back switch 20 is in its "record" position, lead 24 is placed in connection with the erase oscillator of the system for the "record" operation mode.

Figure 5:
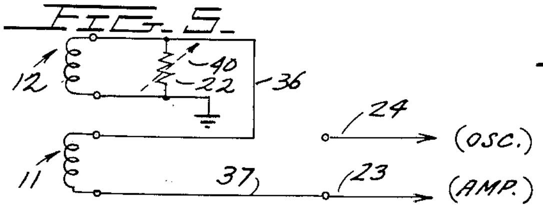
Figure 5 is a simplified electrical diagram of the resultant circuit of the magnetic heads corresponding to the echo on mode of Figure 4.

Figure 5 illustrates the resultant connection of the magnetic heads 11, 12 for the recorder system, corresponding to their interconnection by the echo select switch 25 when in the "echo on" mode of operation. Magnetic head 12 is shunted by resistor 22, with one terminal grounded, and the other terminal connected in series with magnetic head 11 through lead 36, and in turn with the output lead 23 by lead 37. The effective output, by the series connected magnetic heads 11 and 12, is accordingly connected through the selector switch 20 by input lead 23 to the playback connected amplifier circuitry of the recorder system, with switch 20 in the "play-back" position. The input to the play-back circuit is accordingly that of the combined signals picked up by magnetic heads 11 and 12 as will now be understood.

It is noted that the magnetic head 12 is shunted by resistor 22 which, as indicated by the dotted arrow 40, may be an adjustable variable rheostat or potentiometer. A function of resistance 22 is to compensate for different impedances of the magnetic heads 11 and 12 which may be encountered in available production magnetic recorders. However, it is to be understood that the impedances of magnetic heads 11 and 12 may be selected to eliminate the use of such resistor 22 where desired. It is also to be noted that since the "erase" head 11 heretofore used only during the recording mode, is now used as a pickup head to impart signals to the amplifier system during playback. Since head 11 precedes head 12 in the pickup operation, head 11 in effect becomes the initial pickup unit for the recorder during the "echo-on" operation.

In view of the location of the previously used play back head 12 along the tape 10, the head 12 is used as the echo head for the invention system. The use of a rheostat at 22, or a fixed resistor therefor, adjusts the overall effect of the echo signal provided by the pickup unit 12 in combining with the basic picked up signals by head 11, to produce a composite pleasing result. By making the resistor 22 variable as indicated at 40 in Figure 5, a variable echo effect may be had which is adjusted to please the individual operator or pleasing effects for particular instrumental or vocal selections.

It has been found that the echo delay effected by the present invention produces an effect upon music or speech recordings as is heard in a large auditorium. The invention system is applicable to the usual seven and one half inch per second tape 10 speed, or to any other practical speed which magnetic recorders use. Also, it is applicable to professional recorder equipment, where higher speeds are employed.

The delay is proportional to both the spacing *d* (Figures 1 and 2) and the tape speed, and results in a basic sound delay, the overall effect of which is controlled by the value of the resistance 22 shunting the "second" pick-up unit 12. Also, where a different delay than for example .045 second results, due to a different spacing and/or tape speed, a pleasing effect is still attainable by suitable selection of the resistor 22 employed for altering the contribution of the echo by the "second pick-up" to that of the basic pick up by head 11 (with the echo switch 25 in "on").

It is to be understood that by moving the echo switch 25 to "off" position, the circuit is returned to that of normal recording or playback, as indicated in Figure 2. Thereupon, with the main selector switch 20 in the "play back" position, the normally erase head 11 (which is used as the main pick up head during the echo mode), is disconnected from its oscillator circuit. Further, the original pick-up head 12 thereupon becomes the sole head for transmitting the magnetic signals on tape 10 to the recorder amplifier. The resistor 22 is also put out of circuit in these conditions.

Figure 6:
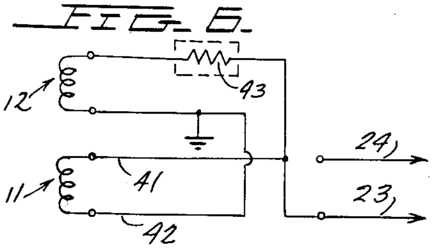
Figure 6 is an electrical diagram of a modified connection of the two magnetic heads, in distinction to that of Figure 5.

Figure 6 shows a modified circuit arrangement which my invention encompasses. The magnetic heads 11 and 12 therein are connected in parallel relationship through leads 41, 42, instead of the series relationship of Figures 4 and 5. With such circuit arrangement, the echo effect due to the delay displacement of the picked up signals of respective head 11, 12, is effective upon output lead 23. Lead 24 remains unconnected during the echo phase of operation. A resistor 43 is placed in series with one of the shunted heads 11, 12 and output lead 23. Resistor 43 is preferably in series with the "second" pickup 12 to adjust its echo level. Another network may be used in series with the shunted pickups 11, 12 to preserve their impedance match with the rest of the circuit, where necessary. Other suitable circuit arrangements may also be employed to obtain the basis results of the invention as set forth hereinabove.

Figure 7:
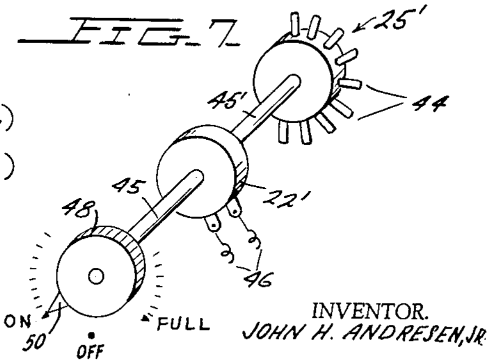
Figure 7 is a schematic illustration of a variable echo effect control, usable in conjunction with the present invention.

Figure 7 illustrates a form of control for providing variable echo effect. The echo on-off switch 25' corresponds to the three section switch 25 of Figure 4, with nine leads 44 for the circuit thereof. Switch 25' is coupled to drive off potentiometer 22' by shaft 45'. Potentiometer or rheostat 22' corresponds to the variable resistor 22, 40 shown in Figure 5 and has leads 46 connectible across the magnetic head 12 when in the "echo" mode. Potentiometer 22' is operated by shaft 45 extending from panel control knob 48. The index 50 of knob 48 moves opposite markings on the panel for "off," "on," and gradations of "full" echo effect.

With index 50 of knob 48 at the "off" position, rheostat 22' is at its minimum or zero resistance position, and echo select switch 25' is in its "echo off" mode corresponding to that of arm 26 to the right position in Figure 4. When knob 48 is moved to the "on" position, select switch 25' assumes a circuit condition corresponding to that shown in Figure 4 wherein arm 26 is to the left for "echo on," and rheostat 22' is at its minimum circuit resistance value, or zero if desired. The interconnections in this "on" position corresponds to the circuit of Figure 5 with rheostat 22 at its minimum resistance setting. The minimum resistance of resistance 22 (and 22') renders the signals picked up by magnetic head 12 at its minimum contribution when combined with head 11 signals.

As the knob 48 is turned clockwise, the resistance of rheostat 22' in the head 12 circuit is increased, to correspondingly have a lesser and lesser signal shunting effect, and thereby increase the amount of the echo signal from head 12 combined with that of head 11. The operator may thus simply, directly and very effectively control the resultant reproduction of the music or speech by the recorder system, simulating desired degrees of reverberation or echo effect upon the main "single dimensional" recording. It is to be noted that the two position echo select switch 25' is suitably linked by shafting indicated at 45' to the 300° rotatable shaft 45, with a linkage not shown but understood to properly actuate them in tandem. Alternatively, the switch 25' may be constructed to provide the necessary two-position action over a 300° sweep, and thus avoid said linkage.

While the present invention has been described in connection with an exemplary embodiment thereof, it is to be understood that variations in its arrangement, circuit, and application may be made that fall within the broader spirit and scope of the invention, as set forth in the following claims.

I claim:

1. In a magnetic recorder system utilizing a linear recording medium, first and second magnetic heads spaced by a predetermined amount along the path of the linear magnetic medium for magnetic coaction therewith, a circuit selector switch for selectively connecting the recorder system into record and playback operation modes, circuit connections between said first head and said selector switch normally establishing recording and playback operation modes for said first head during the respective record and playback operation modes of the recorder system, circuit connections between said second head and said selector switch normally establishing erasing operation for said second head during the record operation mode of the recorder system and an inoperative mode therefor during the playback mode of the system, said second magnetic head being positioned to coact with any given portion of said linear magnetic medium prior to the coaction of said first magnetic head therewith to provide erasing action on the medium before the recording in the record mode, and an echo selector switch circuitally interposed between said circuit connections of both said first and second magnetic heads and said circuit selector switch for interconnecting said magnetic heads therewith to provide an echo effect during the playback operation mode by the recorder system; an amplifier for said recorder system, said first and second magnetic heads being connected in electrical series with said amplifier of said recorder system.

2. In a magnetic recorder system utilizing a linear recording medium, first and second magnetic heads spaced by a predetermined amount along the path of the linear magnetic medium for magnetic coaction therewith, a circuit selector switch for selectively connecting the recorder system into record and playback operation modes, circuit connections between said first head and said selector switch normally establishing recording and playback operation modes for said first head during the respective record and playback operation modes of the recorder system, circuit connections between said second head and said selector switch normally establishing erasing operation for said second head during the record operation mode of the recorder system and an inoperative mode therefor during the playback mode of the system, said second magnetic head being positioned to coact with any given portion of said linear magnetic medium prior to the coaction of said first magnetic head therewith to provide erasing action on the medium before the recording in the record mode, and an echo selector switch circuitally interposed between said circuit connections of both said first and second magnetic heads and said circuit selector switch for interconnecting said magnetic heads therewith to provide an echo effect during the playback operation mode of the recorder system; a resistance means, said resistance means being connectible across one of said magnetic heads through said echo selector switch in its position providing echo effects.

3. A magnetic recorder system as claimed in claim 2, wherein said resistance means comprises a rheostat for controllably varying the echo effect.

4. A magnetic recorder system as claimed in claim 3 wherein said rheostat and said echo selector switch are mechanically coupled for unicontrol of the echo action in the system.

5. In a mangetic recorder system utilizing a linear recording medium, first and second magnetic heads spaced by a predetermined amount along the path of the linear magnetic medium for magnetic coaction therewith, a circuit selector switch for selectively connecting the recorder system into record and playback operation modes, circuit connections between said first head and said selector switch normally establishing recording and playback operation modes for said first head during the respective record and playback operation modes of the recorder system, circuit connections between said second head and said selector switch normally establishing erasing operation for said second head during the record operation mode of the recorder system and an inoperative mode therefor during the playback mode of the system, said second magnetic head being positioned to coact with any given portion of said linear magnetic medium prior to the coaction of said first magnetic head therewith to provide erasing action on the medium before the recording in the record mode, and an echo selector switch circuitally interposed between said circuit connections of both said first and second magnetic heads and said circuit selector switch for interconnecting said magnetic heads therewith to provide an echo effect during the playback operation mode of the recorder system; an amplifier for said recorder system, said first and second magnetic heads being connected in electrical parallel to said amplifier of said recorder system.

6. A magnetic recorder system as claimed in claim 5, further including a resistance network connected in circuit relation with said parallel connected magnetic heads during the echo effect mode of said echo selector switch.

7. In a magnetic recorder system utilizing a linear recording medium, first and second magnetic heads spaced by a predetermined amount along the path of the linear magnetic medium for magnetic coaction therewith, a circuit selector switch for selectively connecting the recorder system into record and playback operation modes, circuit connections between said first head and said selector switch normally establishing recording and playback operation modes for said first head during the respective record and playback operation modes of the recorder system, circuit connections between said second head and said selector switch normally establishing erasing operation for said second head during the record operation mode of the recorder system and an inoperative mode therefor during the playback mode of the system, said second magnetic head being positioned to coact with any given portion of said linear magnetic medium prior to the coaction of said first linear magnetic medium prior to the coaction of said first magnetic head therewith to provide erasing action on the medium before the recording in the record mode, and an echo selector switch circuitally interposed between said circuit connections of both said first and second magnetic heads and said circuit selector switch for interconnecting said magnetic heads therewith to provide an echo effect during the playback operation mode of the recorder system; an amplifier for said recorder system; each of said first and second magnetic heads being connected in predetermined circuit relation with one another and with said amplifier of said recorder system.

References Cited in the file of this patent

UNITED STATES PATENTS

| | | |
|---|---|---|
| 2,235,132 | Wooldridge | Mar. 18, 1941 |
| 2,674,660 | Ambrose | Apr. 6, 1954 |
| 2,804,499 | Butts | Aug. 27, 1957 |

FOREIGN PATENTS

| | | |
|---|---|---|
| 325,699 | Great Britain | Feb. 27, 1930 |
| 685,882 | France | Apr. 7, 1930 |

UNITED STATES PATENT OFFICE

CERTIFICATE OF CORRECTION

Patent No. 2,978,546 April 4, 1961

John H. Andresen, Jr.

It is hereby certified that error appears in the above numbered patent requiring correction and that the said Letters Patent should read as corrected below.

Column 1, lines 50 and 53, for "0.45", each occurrence, read -- .045 --.

Signed and sealed this 17th day of October 1961.

(SEAL)
Attest:

ERNEST W. SWIDER
Attesting Officer

DAVID L. LADD
Commissioner of Patents

USCOMM-DC